UNITED STATES PATENT OFFICE.

FRIEDRICH COLLISCHONN, OF FRANKFORT-ON-THE-MAIN, AND FRIEDRICH RUPPERT, OF MAINZ-MOMBACH, GERMANY, ASSIGNORS TO VEREIN FÜR CHEMISCHE INDUSTRIE IN MAINZ, OF MAINZ, GERMANY.

PROCESS OF MAKING A CELLULOSE ACETATE SOLUBLE IN ETHYL ACETATE.

1,109,512.  Specification of Letters Patent.  Patented Sept. 1, 1914.

No Drawing.   Application filed February 18, 1913.   Serial No. 749,235.

*To all whom it may concern:*

Be it known that we, FRIEDRICH COLLISCHONN, doctor of philosophy and chemist, a subject of the King of Prussia, and resident of Frankfort-on-the-Main, Germany, and FRIEDRICH RUPPERT, doctor of philosophy and chemist, a subject of the King of Prussia, and resident of Mainz-Mombach, Germany, have invented a Process of Making a Cellulose Acetate Soluble in Ethyl Acetate, of which the following is a full, clear, and exact specification.

The cellulose acetate obtainable according to the known processes are characterized by the property that they are soluble either only in chloroform or analogous solvents as acetylene tetrachlorid, or only in acetone. Accordingly a distinction is made between acetyl cellulose soluble in chloroform and acetyl cellulose soluble in acetone.

We have now found a cellulose acetate, which has very valuable technical properties and is distinguished from the hitherto known cellulose acetate by its property to dissolve in pure ethyl acetate to clear, very viscous solutions.

The process for the manufacture of the said new cellulose acetate consists in heating the cellulose acetates soluble in chloroform or acetone, in a solution containing water, in absence of any substance having a hydrolytic action, as for instance inorganic acids, acid salts, at a temperature of 90 to 110° C., till a sample precipitated by water and dried dissolves in pure ethyl acetate to a clear solution. For an accurate carrying out of this transformation it is essential that the cellulose acetate remains dissolved for the whole duration of the operation. In practising this process, we can start either from dry cellulose acetates or directly from the reaction mass resulting from the known acetylating processes, without intermediate separation of the cellulose acetate. In this latter case care must be taken to render the contact substance contained in the reaction mass innocuous by admixing convenient additions to this latter.

The invention is illustrated by the following examples:

Example I: 50 parts of cellulose acetate soluble in chloroform are dissolved at 100° C. in 500 parts of acetic acid of 95 per cent. and heated at 100° C. till a sample of the mass dissolves in ethyl acetate to a clear and viscous solution, what occurs generally after about 20 hours.

Example II: The operation is conducted as in Example I with the difference that acetic acid of 90 per cent. is employed and the temperature is raised to 105–110° C.

Example III: 50 parts of cellulose acetate are heated together with 400 parts of formic acid of 90 per cent. at 100–110° C. till a sample dissolves completely in ethyl acetate ether, what occurs generally after 3–5 hours.

Example IV: To the reaction mass obtained for instance according to the process of German Patent No. 159524 by acting cautiously with 800 parts of acetic anhydrid, 600 parts of glacial acetic acid and 5 parts of sulfuric acid on 200 parts of cotton, are added the quantity of acetic acid of 50 per cent. necessary to the transformation into acetic acid of 90 per cent., that is to say about 285 parts of acetic acid of 50 per cent., and 10 parts of sodium acetate free of water and the so obtained mixture is heated to 105–110° C. till a sample dissolves in ethyl acetate to a clear solution.

Example V: The reaction mass obtained by the action of 350 parts of acetic anhydrid and 400 parts of glacial acetic acid on 100 parts of cellulose, in presence of 5 parts of zinc chlorid and 1 part of hydrochloric acid, is mixed with 130 parts of acetic acid of 50 per cent. previously mixed with 12 parts of an aqueous ammonia solution of 20 per cent.

The mixture is then heated to 105–110° C. till a sample dissolves in ethyl acetate to a clear solution.

From the known cellulose acetates, soluble in ethyl acetate, the new cellulose acetate is distinguished by the particularly great viscosity of its solutions in an ethyl acetate.

What we claim is:

The described process for the manufacture of cellulose acetate soluble in ethyl acetate, consisting in heating solutions of the known cellulose acetates, which contain water, but no substances having a hydrolytic action to a temperature of 90 to 110° C. till a sample of the reaction mass dissolves in ethyl acetate to a clear solution.

In witness whereof we have hereunto signed our names this 7th day of February 1913, in the presence of two subscribing witnesses.

Dr. FRIEDRICH COLLISCHONN.
Dr. FRIEDRICH RUPPERT.

Witnesses:
  JEAN GRUND,
  CARL GRUND